Figure 1:
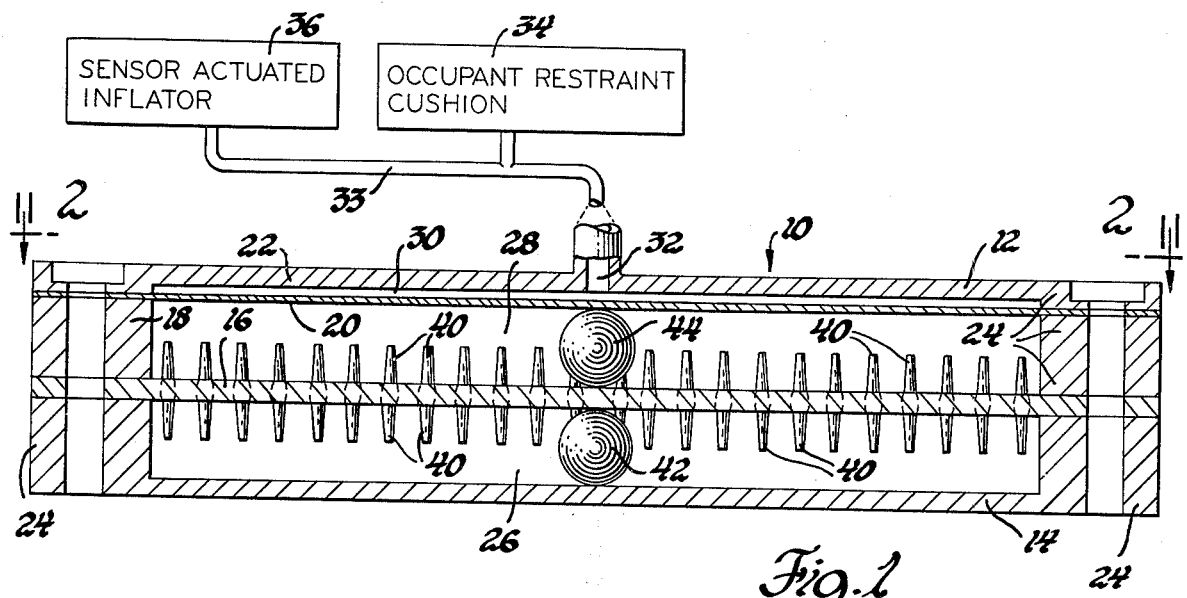

United States Patent [19]
Robbins

[11] B  3,921,463
[45] Nov. 25, 1975

[54] COLLISION RECORDER

[75] Inventor: Samuel B. Robbins, Rochester, Mich.

[73] Assignee: General Motors Corporation, Detroit, Mich.

[22] Filed: Nov. 13, 1972

[21] Appl. No.: 305,868

[44] Published under the Trial Voluntary Protest Program on January 28, 1975 as document no. B 305,868.

[52] U.S. Cl. ............... 73/492; 73/509; 116/114 AH
[51] Int. Cl.² ......................................... G01P 15/04
[58] Field of Search .................... 73/12, 492, 489; 116/114 AH; 346/7; 73/509

[56] References Cited
UNITED STATES PATENTS

| | | | |
|---|---|---|---|
| 3,218,870 | 11/1965 | Baker | 73/492 |
| 3,312,188 | 4/1967 | Lude et al. | 116/114 AH |
| 3,373,716 | 3/1968 | Williams | 116/114 AH |
| 3,707,722 | 12/1972 | Itoh | 346/7 |

*Primary Examiner*—Charles A. Ruehl
*Attorney, Agent, or Firm*—Herbert Furman

[57] ABSTRACT

A collision recorder for an inflatable occupant restraint system includes a circular housing having generally planar spaced upper and lower walls and a third generally planar wall extending parallel to and intermediate the upper and lower walls to provide upper and lower chambers in the housing. A plurality of breakable pins project from the intermediate third wall into the upper and lower chambers. An inertia mass is located in each of the chambers and is surrounded by the pins which are broken off upon movement of the inertia masses during collision impact to record the direction and intensity of the impact. A plastically deformable diaphragm is mounted in the housing generally adjacent the upper wall and forms therewith a third chamber which is connected to the pressure fluid manifold for the inflatable occupant restraint cushion. Upon inflation of the cushion, pressure fluid forces the diaphragm to capture the inertia mass in the adjacent chamber to record the time relationship between onset of the impact and deployment of the cushion.

6 Claims, 2 Drawing Figures

COLLISION RECORDER

The invention relates to a collision recorder for a motor vehicle and more particularly to a device for recording the direction and magnitude of the collision and the time relationship between the impact and inflation of an occupant restraint cushion.

It is known to mount a shock indicating device on a shipping container, which device includes an inertial body supported on fingers which are permanently crushed by movement of the inertial body in response to a shock force.

It is also known to provide an inflatable restraint cushion in a motor vehicle, which cushion is inflated upon impact to restrain the occupant. The present invention provides a collision recorder which records the direction and magnitude of the vehicle impact and the time relationship between onset of the impact and deployment of the restraint cushion.

According to the preferred embodiment of the invention, a collision recorder includes a circular housing having generally planar spaced upper and lower walls. A third generally planar wall of the housing extends parallel to and intermediate the upper and lower walls to provide upper and lower chambers in the housing. A plurality of breakable pins project upwardly from the intermediate planar member into the upper chamber and downwardly from the intermediate planar member into the lower chamber. An inertia mass of predetermined weight is located in the center of each of the chambers so as to be surrounded by the pins. The housing is mounted on the vehicle with the planar walls oriented generally horizontal. When the vehicle is impacted during a collision, inertia forces acting on the inertia masses cause movement thereof in a direction toward the point of impact. The movement of the masses breaks off a number of pins proportional to the intensity of the impact. A plastically deformable diaphragm such as a lead plate is mounted in the housing generally adjacent the upper generally planar wall thereof just above the upper inertia mass to provide a third chamber in the housing. This third chamber is connected to the pressure fluid distributing manifold of the occupant restraining system so that upon actuation of the restraint system the pressure fluid forces the plastically deformable diaphragm downwardly to capture the upper inertia mass at its then existing position. Thus it is seen that the breakage of pins in the lower chamber may be analyzed to determine the deceleration history of the entire collision. The breakage of pins in the upper chamber may be compared to that in the lower chamber to determine the time relationship between onset of the impact and deployment of the occupant restraint cushion.

One feature of the invention is to provision of a generally planar member aligned generally parallel to the direction of vehicle movement and having a plurality of frangible means breakable by an inertia mass which moves along the planar member when the vehicle is impacted.

A further feature of the invention is the provision of a collision recorder wherein pins projecting from a plate are broken by an inertia mass when subjected to an impact force and a diaphragm is movable in response to deployment of an occupant restraint cushion to arrest further movement of the inertia mass.

Another feature of the invention is the provision of a vehicle collision recorder including first and second mechanical recording devices, the first providing a record of a complete deceleration history of the collision and the second recording the history of the collision up until deployment of the occupant restraint cushion.

Figure 2:
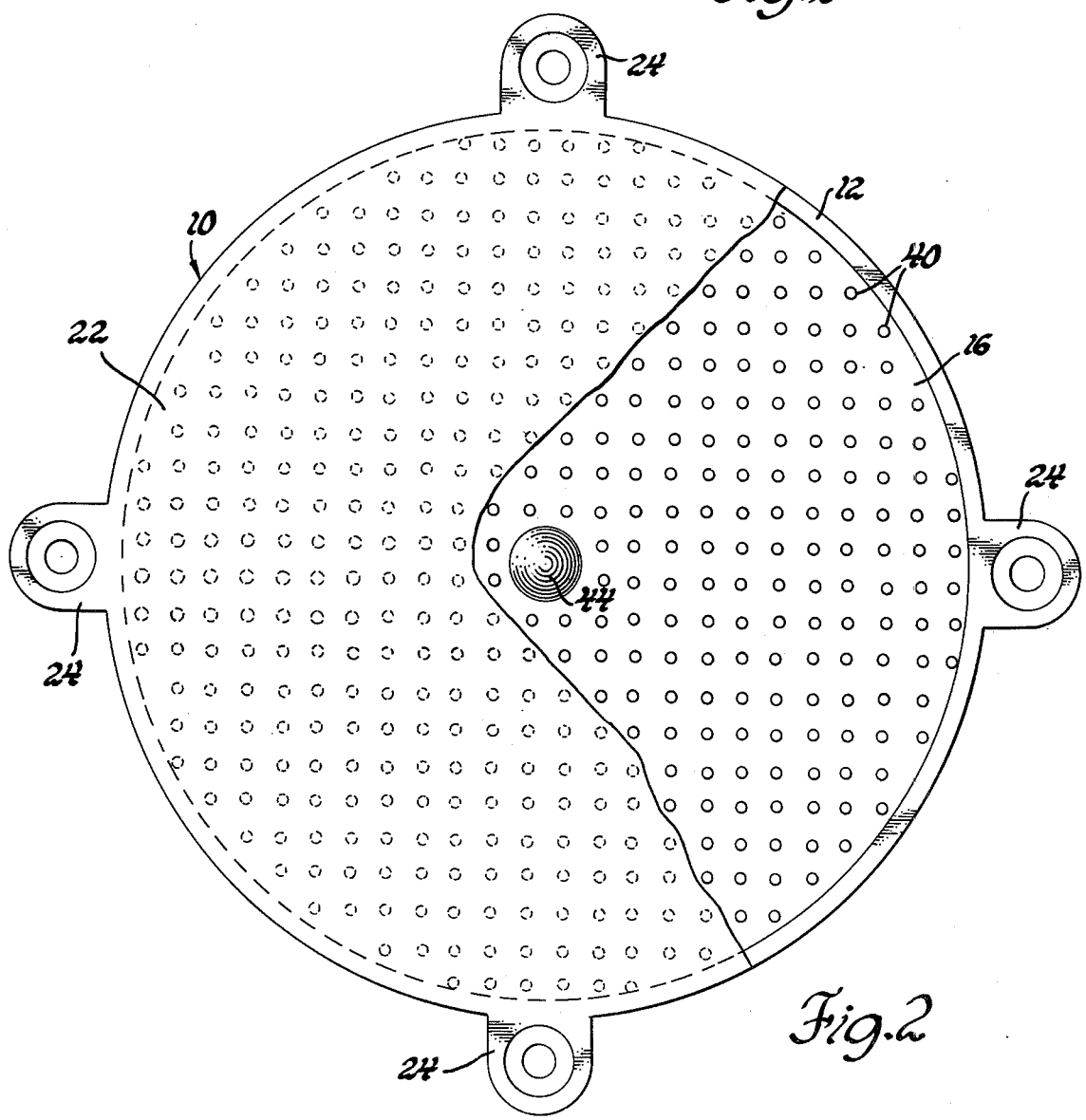

These and other features of the invention will become apparent upon consideration of the specification and the appended drawings in which:

FIG. 1 is an elevation view of the collision recorder having parts broken away and in section; and FIG. 2 is a plan view taken in the direction of arrows 2—2 of FIG. 1 and having parts broken away.

Referring to FIGS. 1 and 2, the collision recorder 10 includes a circular housing 12 comprised of a base 14, plate 16, a spacer ring 18, a diaphragm 20, and a cover 22. Each of the aforementioned elements comprising the housing 12 has aligned circumferentially spaced mounting lugs 24 drilled to receive a bolt for assembling the housing and attaching it to the motor vehicle.

The base 14 and cover 22 respectively provide generally planar spaced upper and lower walls of the circular housing. The generally planar plate 16 is located intermediate and in spaced relation from the base 14 and cover 22 to provide a wall dividing the housing 12 into a lower chamber 26 and an upper chamber 28. The diaphragm 20 is of a plastically deformable material such as thin lead plate and defines a third chamber 30 in cooperation with cover 22. The third chamber 30 is connected via an inlet port 32 to the pressure fluid manifold 33 for an inflatable occupant restraint system including a pressure inflated occupant restraint cushion 34 and a sensor actuated inflator 36.

As best seen in FIG. 1, a plurality of breakable pins 40 are press fitted into the plate 16 in an ordered pattern and project normally therefrom downwardly into the lower chamber 26 and upwardly into the upper chamber 28. The pins 40 are preferably of a lead tin alloy or other material which breaks at a predetermined force applied normal to the axis throughout a broad range of ambient temperature conditions. Inertia masses or balls 42 and 44 are respectively centrally located in the lower chamber 26 and upper chamber 28. The pins 40 are preferably tapered and extend to a height equal to the radius of the balls 42 and 44 so that the inertia forces are consistently applied normally at the tip of the pins 40. The collision recorder 10 is mounted in the motor vehicle with the generally planar walls thereof located generally horizontal.

When the vehicle is impacted during a collision the inertia of the balls 42 and 44 will cause them to move relative the housing 12 in the direction toward the impact and break off pins 40 in proportion to the severity of such impact. The ball 42 is not restrained and accordingly its path of movement through the pins 40 in the lower chamber 26 may be analyzed to provide the time history of the entire collision. The deceleration in g's needed to break a pin 40 can be simply calculated by the formula $A = F/W$; where $F$ is the force needed to break the pin and $W$ is the weight of the ball. The number of pins broken during the collision are counted and then multiplied by the g's deceleration needed to break a pin.

At a predetermined sensed deceleration during a collision the sensor actuated inflator 36 provides pressure fluid for deployment of the occupant restraint cushion 34. This pressure fluid is in turn communicated through pressure fluid manifold 33 and inlet port 32 to the third chamber 30 where it forces the plastically deformable diaphragm 20 downwardly to capture the ball 44 at its then existing position and thereby maintain a permanent record of the point during the collision at which the occupant restraint was deployed. The g's deceleration at which the cushion 34 was deployed is determined by counting the pins 40 broken in upper chamber 28 and multiplying by the g's deceleration needed to break a pin.

Thus it is seen that the invention provides a first recorder providing a record of a complete deceleration history of the collision and a second recorder recording the deceleration history of the collision up until the time of the deployment of the occupant restraint cushion.

What is claimed is:

1. A collision recorder comprising a planar member, a plurality of discrete frangible means carried by the planar member and an inertia mass movable on the planar member, said discrete frangible means being positioned on said planar member to surround the inertia mass, the inertia mass moving and serially breaking said surrounding frangible means when subjected to a predetermined impact induced deceleration force whereby the path of movement of the inertia mass through the frangible means indicates the direction of impact and the number of frangible means broken during such movement indicates the magnitude of the deceleration force.

2. A collision recorder for an occupant restraint system, said collision recorder comprising, a planar member, a plurality of spaced frangible means carried by the planar member, an inertia mass movable on the planar member and surrounded by the plurality of frangible means, the inertia mass moving and breaking the frangible means when subjected to a predetermined deceleration force, and means for capturing the inertia mass upon actuation of the occupant restraint system.

3. A collision recorder comprising, a housing having a planar member, a plurality of pins projecting normally from the planar member, and an inertia mass surrounded by the pins and moving and breaking off said pins when subjected to a predetermined impact induced deceleration force whereby the path of movement of the inertia mass through the pins is indicative of the direction of imposition of the impact force and the number of pins broken during such movement is indicative of the magnitude of the deceleration force.

4. A collision recorder for an occupant restraint system, said collision recorder comprising, a housing having a pair of spaced generally planar members aligned parallel to the direction of vehicle travel, a plurality of pins projecting from at least one of the planar members, an inertia mass confined between the spaced generally planar members and surrounded by the plurality of pins, the inertia mass moving and breaking off the pins when subjected to a predetermined deceleration force, and means responsive to actuation of the occupant restraint system for capturing the inertia mass at its then existing location to thereby record the deployment of occupant restraint system during the collision impact.

5. A recorder for a fluid pressure actuated occupant restraint system, said recorder comprising a housing having a pair of spaced generally planar members aligned parallel to the direction of vehicle travel, a plurality of pins projecting from one of the planar members, an inertia mass confined between the spaced generally planar members and surrounded by the plurality of pins, the inertia mass moving and breaking off the pins when subjected to a predetermined deceleration force, and pressure responsive plastically deformable diaphragm means located in the housing adjacent the other of the generally planar members and communicated to the pressure actuated occupant restraint system whereby occupant restraint system actuating pressure fluid plastically deforms the diaphragm about the inertia mass to capture the inertia mass at its then existing location within the pins.

6. In a fluid pressure actuated occupant restraint system, a recorder comprising, a housing having a pair of generally planar end walls aligned with the direction of vehicle travel, a third generally planar wall located intermediate and spaced from the end walls to provide upper and lower chambers, a plurality of pins projecting from the third wall downwardly into the lower chamber and upwardly into the upper chamber, first and second inertia masses located respectively within the upper and lower chambers and being surrounded by the pins, the first and second inertia masses being movable to break off said pins when subjected to predetermined deceleration force, and pressure responsive plastically deformable diaphragm means located in the housing adjacent one of the generally planar end walls and communicated to the pressure actuated occupant restraint system whereby occupant restraint system actuating pressure fluid plastically deforms the diaphragm about the adjacent inertia mass to capture the inertia mass at its then existing location within the pins.

* * * * *